United States Patent [19]
Godfrey et al.

[11] 3,714,223
[45] Jan. 30, 1973

[54] PROCESS FOR PREPARING AMINONITRILES

[75] Inventors: John J. Godfrey; Charles R. Morgan, both of Silver Spring, Md.

[73] Assignee: W. R. Grace & Co., New York, N.Y.

[22] Filed: Dec. 15, 1969

[21] Appl. No.: 885,107

Related U.S. Application Data

[63] Continuation-in-part of Ser. No. 636,662, May 8, 1967, Pat. No. 3,515,742.

[52] U.S. Cl. ............................................260/465.5 A
[51] Int. Cl. ...............................................C07c 121/42
[58] Field of Search ..............................260/465.5 A

[56] References Cited

UNITED STATES PATENTS

| | | | |
|---|---|---|---|
| 2,855,428 | 10/1958 | Singer et al. | 260/465.5 |
| 3,424,783 | 1/1969 | Harper et al. | 260/465.5 |
| 3,463,805 | 8/1969 | Morgan et al. | 260/465.5 |
| 2,504,011 | 3/1970 | Gandhi | 260/465.5 A |
| 3,515,742 | 6/1970 | Morgan et al. | 260/465.5 A |

*Primary Examiner*—Joseph P. Brust
*Attorney*—Elton Fisher and Kenneth E. Prince

[57] ABSTRACT

An aminonitrile having the formula $R-N=(CH_2CN)_2$, where R is a straight chain non-branched alkyl group having about one to 12 carbon atoms, is prepared by; (a) mixing a primary amine having the formula $R-NH_2$, where R is as defined supra, formaldehyde, and water to form a first mixture; (b) cooling the first mixture to about 0-35°C.; (c) adding sulfuric acid and water in a weight ratio of sulfuric acid, as $H_2SO_4$, to water of about 1:0.5-4, to the first mixture while cooling to maintain the temperature of the resulting second mixture within the range of about 0-35°C., the mole ratio of amine to $H_2SO_4$ being about 1:0.1-1.5; (d) adding hydrogen cyanide to the second mixture, the mole ratio of amine to hydrogen cyanide being about 1:1.8-2.5 to form a third mixture; and (e) forming the aminonitrile product and a mother liquor by maintaining the third mixture in a closed reaction zone under substantially adiabatic conditions for about 10-300 minutes.

6 Claims, 5 Drawing Figures

John J. Godfrey
Charles R. Morgan
INVENTORS

Elton Fisher
ATTORNEY

PROCESS FOR PREPARING AMINONITRILES

CROSS REFERENCE TO RELATED APPLICATION

This is a continuation-in-part of our copending application Ser. No. 636,662, filed May 8, 1967, now U.S. Pat. No. 3,515,742.

BACKGROUND OF THE INVENTION

This invention is in the field of aminonitrile preparation. More specifically, it is directed to the preparation of aminonitriles having the formula $$R-N=(CH_2CN)_2$$

where R is a straight chain non-branched alkyl group having about one to 12 carbon atoms.

Aminonitriles prepared according to the procedure of this invention can be saponified (e.g., by treating with an aqueous alkali metal hydroxide) to form salts of aminocarboxylic acids. These salts can be converted to the free aminocarboxylic acids (e.g., by acidification with a mineral acid such as $H_2SO_4$ or HCl). These carboxylic acids and their salts are useful as chelating agents. Chelates of these materials with trace metals are useful to supply trace metals to soil. The alkali metal salts of these carboxylic acids are useful in detergents, especially in detergents used with water containing calcium ions.

Our U.S. Pat. No. 3,463,805 discloses a procedure for preparing aminonitriles.

U.S. Pat. Nos. 3,337,607, 3,061,628, and 2,855,428 also disclose methods for preparing aminonitriles.

SUMMARY OF THE INVENTION

In summary this invention is directed to a process for preparing a product aminonitrile having the formula $$R-N=(CH_2CN)_2$$

where R is a straight chain non-branched alkyl group having about one to 12 carbon atoms, comprising:

a. admixing a primary amine having the formula R—$NH_2$, where R is as defined supra, formaldehyde, and water, the mole ratio of amine to formaldehyde (in the resulting first mixture) being about 1:2–2.5, and the weight ratio of amine to water (in said resulting mixture) being about 1:0.4–2 to form a first mixture. The formaldehyde can be added as an aqueous solution analyzing about 25–50 percent (preferably about 35–40 percent by weight HCHO and "make up" water (if required) can be added as needed to give the aforesaid ratio of amine to water).

b. cooling the first mixture to about 0–35°C.;

c. admixing sulfuric acid and water (if desired, the acid and water can be mixed and cooled before being admixed with the first mixture), the weight ratio of sulfuric acid, as $H_2SO_4$, to water being about 1:0.5–4, with the cooled first mixture while cooling the resulting second mixture to maintain the temperature thereof within the range of about 0–35°C., the mole ratio of amine to sulfuric acid, as $H_2SO_4$, in the second mixture being about 1:0.1–1.5;

d. admixing hydrogen cyanide and the second mixture while cooling the resulting third mixture to maintain the temperature thereof within the range of about 0–35°C., the mole ratio of amine to hydrogen cyanide in the third mixture being about 1:1.8–2.5;

e. forming the aminonitrile product and a mother liquor by maintaining the third mixture in a closed reaction zone under substantially adiabatic conditions for about 10–300 minutes; and (e.g., f. separating the aminonitrile from the mother liquor e.g., by decantation, centrifugation and the like), and recovering the separated aminonitrile which can be dried (e.g., at about 15–100°C., preferably under reduced pressure (e.g., 1–200 mm. of mercury absolute)).

BRIEF DESCRIPTION OF THE DRAWINGS

The drawings (FIGS. 1–4) are plots of temperature as a function of time where applying the substantially adiabatic process of the instant invention to the preparation (or attempted preparation) of nitriles from a number of amines.

DESCRIPTION OF PREFERRED EMBODIMENTS

Figure 1:
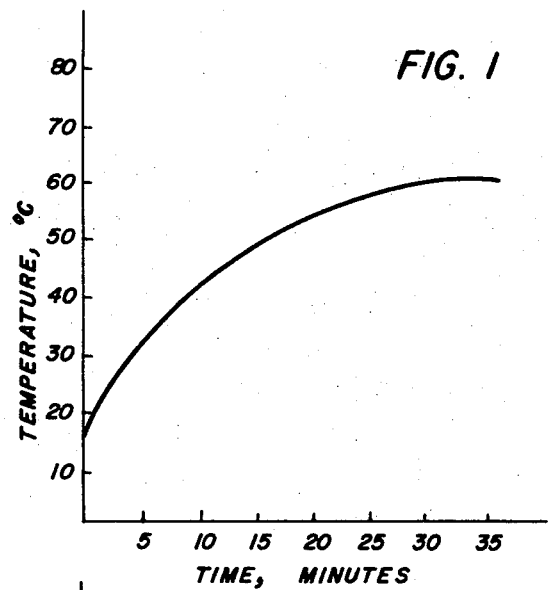

In preferred embodiments of the process set forth in the above summary:

1. The weight ratio of sulfuric acid, as $H_2SO_4$, to water is about 1:1–3.
2. The mole ratio of amine to sulfuric acid, as $H_2SO_4$, is about 1:0.12–1 (or 1:0.15–0.9).
3. The third mixture is maintained under substantially adiabatic conditions for about 30–100 minutes.
4. R is methyl, n-butyl, or n-octyl.
5. The first mixture is cooled to about 5–15°C.

DETAILED DESCRIPTION OF THE INVENTION

As noted supra, this invention is directed to the preparation of aminonitriles having the formula $$R-N=(CH_2CN)_2$$

where R is a straight chain non-branched alkyl group having about one to 12 carbon atoms.

In the process of this invention, the product nitrile is formed by an exothermic (heat producing) reaction or sequence of reactions which, it is believed, can be represented by the following overall equation:

$$R-NH_2 + 2HCHO + 2HCN \xrightarrow{H^+} R-N=(CH_2CN)_2 + 2H_2O$$

The sulfuric acid is used to supply hydrogen ions ($H^+$ or $H_3O^+$) required to make the process operable. An equivalent source of hydrogen ions (e.g., HCl, pyrophosphoric acid, orthophosphoric acid and the like) can be used in place of the sulfuric acid, but for economic reasons we prefer to use $H_2SO_4$.

Because of the exothermic nature of the reactions involved and the very toxic nature of HCN, prior workers where preparing aminonitriles from HCN, HCHO and an amine exercised great caution in combining the reactants. In order to prevent expected violent exotherms and possible escape of hydrogen cyanide and because of expected rapid pressure increases, the reactants were combined in a manner which involved slow addition of either the amine or hydrogen cyanide ingredient to a premixed combination of the remaining reactants. The slow addition of the rate regulating ingredient was attended by careful heat exchange (temperature control) in order to avoid excessive liberation of hydrogen cyanide from the reaction mixture, and to avoid the necessity of employing apparatus capable of withstanding expected high pressures.

Such slow combination of reactants and/or close temperature control is tedious and expensive; particularly when large volume production is contemplated.

It is therefore an object of the present invention to provide an improved method for producing aminonitriles.

It is another object to provide a method by which superior yields of aminonitriles can be quickly and efficiently obtained.

It is a further object to provide a method by which an amine of the type disclosed in the above summary, formaldehyde, hydrogen cyanide can be combined under aqueous-acidic reaction conditions to safely and rapidly produce an aminonitrile of the type disclosed in the above summary.

The formaldehyde (HCHO) utilized in the practice of our invention can be commercially available 37 percent aqueous solution of formaldehyde or the formaldehyde can be partially or entirely derived from other sources such as paraformaldehyde and the like, which are fully equivalent to the aforesaid HCHO solution, or an aqueous HCHO solution analyzing about 35–50 percent HCHO can be used.

The HCN reactant can be obtained from any suitable commercial source or it can be generated by reacting an alkali metal or alkaline earth metal cyanide with strong acid. The HCN is normally introduced into the reaction system (reaction zone) as liquid HCN, as HCN vapor, or as an aqueous HCN solution.

In conducting the process of the instant invention, it is generally preferred that the formaldehyde and HCN reactants both be present in approximately the stoichiometric amounts required to react with the amine reactant to yield the desired aminoacetonitrile. However, an excess of either formaldehyde or HCN (or of both formaldehyde and HCN) can be conveniently used. Also, a slight excess of the amine reactant over the HCN can be used, but because of economic considerations, this is generally avoided.

Because only minimum autogenous pressures are attained in the practice of the instant invention, it is readily apparent, as a consequence of our disclosure, that the process (or method) of our invention provides a means for producing aminonitriles which does not require the utilization of closely controlled temperature or reactant addition conditions.

The present substantially adiabatic reaction procedure can be conducted on either a batchwise or continuous basis. When the procedure is carried out continuously, the reactants are pumped through an elongated reaction chamber.

The process of this invention can conveniently take place in conventional stainless steel or glass-lined equipment wherein the reaction zone is provided with adequate insulation to provide substantial adiabatic (i.e., non-heat transfer) reaction conditions. Further, the reaction apparatus should be designed so that autogenous pressure increases in the order of about 3–4 or 5 atmospheres can be tolerated.

Subsequent to the reaction, the final reaction mixture which comprises the desired aminoacetonitrile and mother liquor, is preferably cooled to a temperature of about 10–50°C. to make certain that the aminonitrile is present as a solid precipitate or a liquid which is substantially insoluble in the mother liquor in which the aminonitrile is formed. The thus formed aminonitrile can be readily recovered by conventional centrifugation or decantation techniques, or by a combination thereof. Where in the solid state, the nitrile can also be separated by filtration. The mother liquor is saturated with the aminonitrile product which also contains residual amounts of of makeup ingredients.

The aminonitrile products prepared by the process of the instant invention possess a high degree of purity and can be readily hydrolyzed to form alkali metal salts or the corresponding amino acids. The hydrolysis reaction can be conducted by way of any well known techniques such as reaction with alkali metal hydroxide (e.g., sodium hydroxide), for example, at temperatures ranging from about 50–130°C. In one specific embodiment, the aminonitrile reaction product is conducted directly from the reaction zone at elevated temperatures to a hydrolysis step without intermediate isolation. The alkali metal salts of said amino acids can be readily converted to the corresponding free acids by treatment with a strong acid (e.g., $H_2SO_4$, and the like). Said amino acids and their alkali metal salts are excellent chelating agents for metal ions and have found use as detergents and as analytical reagents for use in the detection and determination of metallic ions.

The instant invention will be better understood by referring to the following specific but nonlimiting examples. It is understood that said invention is not limited by these examples, which are offered merely as illustrations; it is also understood that modifications can be made without departing from the spirit and scope of the invention.

EXAMPLE I

A 1 mole portion (73.1 grams) of n-butyl amine and 2.2 moles (179 grams) of an aqueous formaldehyde solution (37% HCHO by weight) were admixed to form a first mixture which was cooled to 18°C.

A second mixture of sulfuric acid and water (0.5 mole (51 grams) of an aqueous sulfuric acid solution analyzing 96% $H_2SO_4$ by weight and 100 grams of water) previously cooled to about 30°C. was admixed with the first mixture to form a third mixture — cooling the resulting third mixture as it formed to maintain its temperature below about 30°C.

A 2.2 mole portion (59.4 grams) of liquid substantially anhydrous hydrogen cyanide was added to the third mixture to form a fourth mixture — cooling the resulting fourth mixture to maintain its temperature below about 25°C.

The temperature of the fourth mixture was adjusted to 16–18°C. and said mixture was placed in a Dewar flask provided with a thermowell. The flask was then closed, and the temperature of the mixture within the closed flask was determined over a period of time by means of a thermocouple positioned in the thermowell which extended into the liquid within the Dewar flask. Said temperature was plotted at a function of time (see FIG. 1).

After 35 minutes, the flask was opened; its contents were removed and cooled to about 25°C. Two liquid phases, an aqueous (mother liquor) phase and a nonaqueous (product) phase were present. The product was separated from the mother liquor using a separatory funnel. The separated product was washed with three 25 ml portions of ice water, recovered, dried at about 50°C. for 8 hours at about 100 mm of mercury absolute pressure and weighed. This dry product which weighed 124 grams, was identified as $CH_3CH_2CH_2CH_2-N=(CH_2CN)_2$ by its infrared spectrum and by nuclear magnetic resonance (NMR).

In other runs, the ice water was replaced with wash water at about 15, 20 and 30°C. The conversions (one pass yields) of such runs were substantially identical with that where using an ice water wash.

EXAMPLE II

The general procedure of Example I was repeated, however, in this instance only about 0.13 mole of $H_2SO_4$ was used in place of the 0.5 mole of Example I.

Figure 2:
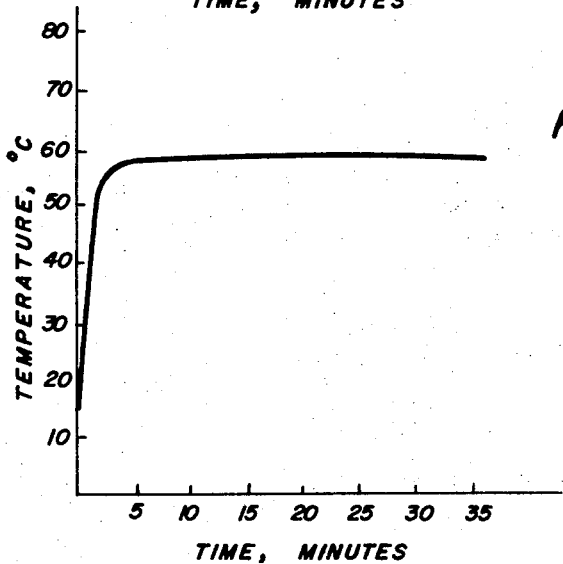

FIG. 2 is a plot of the temperature of the mixture within the flask as a function of time.

In this instance, the recovered product weighed 123 grams (after drying).

In another run, the above procedure (that of Example II) was modified by opening the Dewar flask after 10 minutes, separating recovering, washing and drying the solid product. Said product weighed 125 grams.

EXAMPLE III

The general procedure of Example I was repeated. However, in this instance, the procedure was modified by replacing the n-butyl amine with 1 mole of tertiary butyl amine (t-butyl amine).

Figure 3:
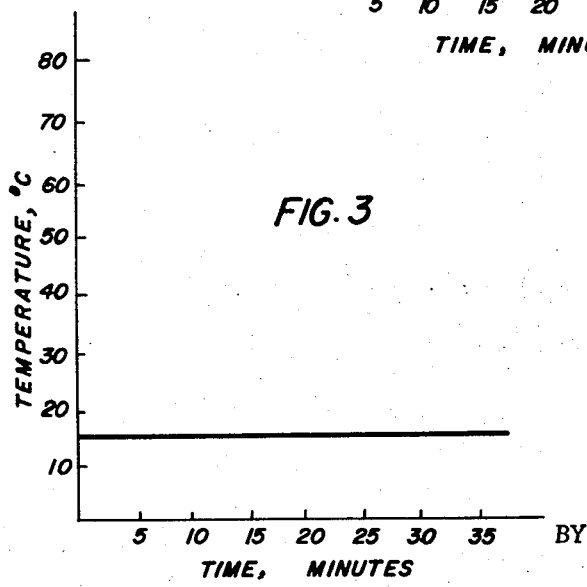

The fourth mixture (prepared from the t-butyl amine) was placed in a Dewar flask which was provided with a thermowell, then closed and allowed to stand for about 35 minutes while determining the temperature within the flask with a thermocouple placed in the thermowell which extended into the liquid in the Dewar flask. No increase in temperature was noted (see FIG. 3). In other words, no reaction occurred.

The flask was opened at the end of 35 minutes and its contents were removed. No detectable quantity of aminoacetonitrile was found in said contents.

The general procedure of the instant example (Example III) was repeated; however, in this run only 0.12 mole of $H_2SO_4$ was used in place of the previous 0.5 mole. The results were indistinguishable from those obtained where using 0.5 mole of $H_2SO_4$.

Substantially identical results were obtained when the t-butyl amine was replaced with 2-amino-2-methyl butane.

These surprising results show that amines having the formula $$R^1-NH_2$$

where $R^1$ is an alkyl group having a branched chain (i.e., is *not* a straight chain nonbranched alkyl group) do not form nitriles under the substantially adiabatic conditions used in the instant process.

In other words, is it critical that the primary amines used in the process of this invention have the formula $R-NH_2$ and that R be a straight chain nonbranched alkyl group, said group can have about one to 12 carbon atoms.

EXAMPLE IV

Figure 4:
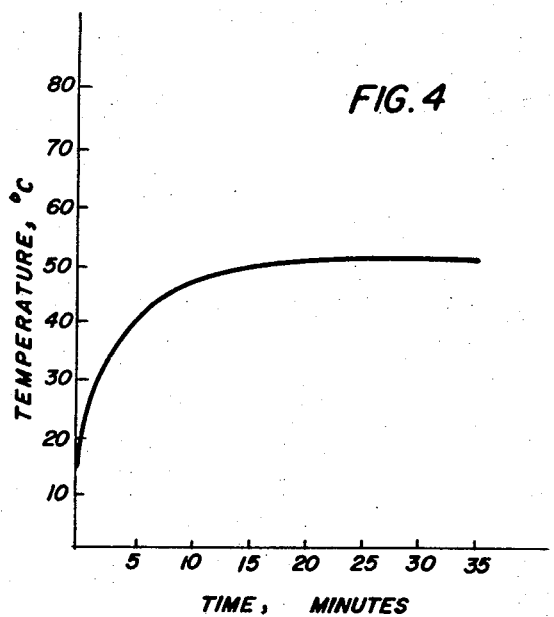

The general procedure of Example I was repeated; however, in this instance the n-butyl amine was replaced with methyl amine. FIG. 4 is a plot of the temperature of the material in the Dewar flask as a function of time.

Liquid product weighing 100 grams (after washing and drying) was recovered. This product was identified as $$CH_3-N=(CH_2CN)_2$$

by its infrared spectrum and by NMR.

EXAMPLE V

Figure 5:
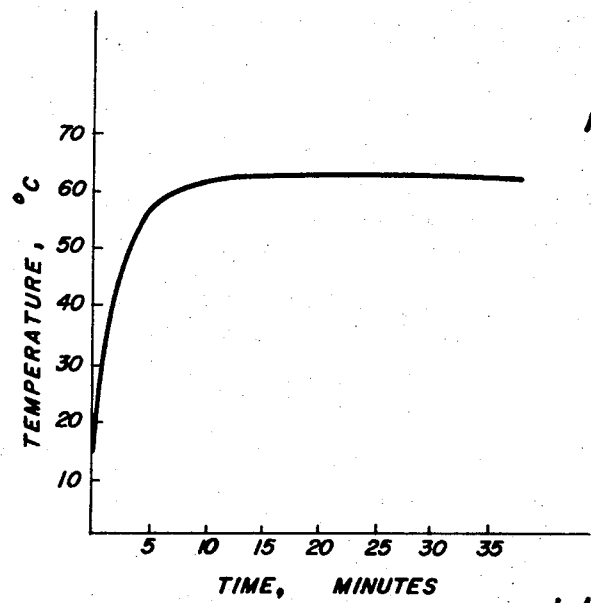

The general procedure of Example I was repeated. However, in this instance the n-butyl amine was replaced with n-octyl amine. FIG. 5 is a plot of the temperature of the material in the Dewar flask as a function of time.

A liquid product weighing about 180 grams (after washing and drying) was recovered. This product was identified as $$CH_3(CH_2)_6CH_2-N=(CH_2CN)_2$$

by its infrared spectrum and by NMR.

Substantially identical results (except that the final product was $CH_3(CH_2)_{10}CH_2-N=(CH_2CN)_2$) were obtained when the n-octyl amine was replaced with n-dodecyl amine ($CH_3(CH_2)_{10}CH_2-NH_2$).

As used herein, the term "percent (%)" means parts per hundred by weight unless otherwise defined where used. It is obvious that percent conversion is a dimensionless number.

As used herein, the term "mole" has its generally accepted meaning; i.e., a mole is that quantity of a substance which contains substantially the same number of molecules as there are atoms in 12 grams of pure $^{12}C$.

We claim:

1. In a process for preparing an aminonitrile having the formula $R-N=(CH_2CN)_2$ wherein R is a straight chain non-branched alkyl group having about one to 12 carbon atoms, the improvement comprising the following sequential steps:

a. forming a first mixture by admixing; (i) a primary amine having the formula $R-NH_2$, wherein R is as defined supra; (ii) formaldehyde; and (iii) water and cooling the resulting first mixture to maintain the temperature thereof within a range of about 0–35°C. by removing heat produced by an exotherm resulting from mixing the primary amine, the formaldehyde, and the water, the mole ratio of primary amine to formaldehyde being about 1:2–2.5 and the weight ratio of primary amine to water being about 1:0.4–2;

b. forming a second mixture by admixing; (i) sulfuric acid; (ii) water; and (iii) the first mixture from step (a) while cooling the resulting second mixture to maintain the temperature thereof within a range of about 0–35°C., the mole ratio of primary amine to sulfuric acid being about 1:0.1–1.5 and the weight ratio of sulfuric acid, as $H_2SO_4$, to water being about 1:0.5–4;

c. forming a third mixture by admixing hydrogen cyanide and the second mixture while cooling the resulting third mixture to maintain the temperature thereof within the range of about 0–35°C., the mole ratio of amine to hydrogen cyanide being about 1:1.8–2.5;

d. forming the aminonitrile and a mother liquor by maintaining the third mixture under substantially adiabatic conditions in a closed reaction zone for about 10–300 minutes; and e. separating the aminonitrile from the mother liquor, and recovering the separated aminonitrile.

2. The process of claim 1 in which the weight ratio of sulfuric acid, as $H_2SO_4$, to water is about 1:1–3.

3. The process of claim 1 in which the mole ratio of amine to sulfuric acid, as $H_2SO_4$, is about 1:0.12–1.

4. The process of claim 1 in which the third mixture is maintained under substantially adiabatic conditions for about 30–100 minutes.

5. The process of claim 1 in which R is methyl, n-butyl, or n-octyl.

6. The process of claim 1 in which the first mixture is cooled to about 5–15°C.

* * * * *